United States Patent
Nasu et al.

(10) Patent No.: US 8,997,247 B2
(45) Date of Patent: Mar. 31, 2015

(54) INFORMATION PROCESSING DEVICE, INFORMATION PROCESSING METHOD, AND COMPUTER-READABLE RECORDING MEDIUM

(75) Inventors: Masami Nasu, Kanagawa (JP); Jun Satoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1676 days.

(21) Appl. No.: 12/365,194

(22) Filed: Feb. 4, 2009

(65) Prior Publication Data

US 2009/0204809 A1 Aug. 13, 2009

(30) Foreign Application Priority Data

Feb. 12, 2008 (JP) ................................ 2008-030929

(51) Int. Cl.
*H04L 9/00* (2006.01)
*H04L 9/32* (2006.01)
*G06F 21/10* (2013.01)

(52) U.S. Cl.
CPC .............. *H04L 9/3263* (2013.01); *G06F 21/10* (2013.01); *H04L 9/3273* (2013.01)
USPC .......................................................... 726/27

(58) Field of Classification Search
CPC ............ H04L 63/0823; H04L 63/0853; H04L 63/0869; H04L 63/0884; H04L 63/12; H04L 63/0281; G06F 21/33; G06F 21/10; G06F 21/30; G06F 21/305; G06F 21/105
USPC ............... 713/156; 726/5, 6, 7, 12, 27, 28, 29
See application file for complete search history.

(56) References Cited

U.S. PATENT DOCUMENTS

| | | | |
|---|---|---|---|
| 6,233,577 B1* | 5/2001 | Ramasubramani et al. | 1/1 |
| 7,165,040 B2* | 1/2007 | Ehrman et al. | 705/22 |
| 7,333,989 B1* | 2/2008 | Sameshima et al. | 707/770 |
| 7,647,501 B2* | 1/2010 | Imai | 713/175 |
| 7,739,583 B2* | 6/2010 | Barrus et al. | 715/201 |
| 2005/0160259 A1* | 7/2005 | Ogura et al. | 713/156 |
| 2006/0117013 A1* | 6/2006 | Wada | 707/9 |
| 2006/0292984 A1* | 12/2006 | Teate et al. | 455/41.2 |
| 2007/0070060 A1* | 3/2007 | Kagawa et al. | 345/418 |
| 2007/0288247 A1* | 12/2007 | Mackay | 705/1 |
| 2008/0015955 A1* | 1/2008 | Ehrman et al. | 705/28 |
| 2008/0021877 A1* | 1/2008 | Saito et al. | 707/3 |

(Continued)

FOREIGN PATENT DOCUMENTS

CN 101340568 A * 1/2009
JP 2004-320715 11/2004

*Primary Examiner* — Tamara T Kyle
(74) *Attorney, Agent, or Firm* — IPUSA, PLLC

(57) ABSTRACT

An information processing device is arranged to acquire a first public key certificate and a first secret key from a server device by acquiring an individual identification information which is uniquely discriminable for the information processing device from the information processing device and transmitting the individual identification information to the server device. The information processing device is arranged to determine whether the information processing device is permitted to transmit device information to the server device through an encryption communication using the first public key certificate and the first secret key, by acquiring the individual identification information from the information processing device and comparing the acquired individual identification information with the individual identification information associated with at least one of the first public key certificate and the first secret key.

9 Claims, 12 Drawing Sheets

(56) References Cited

U.S. PATENT DOCUMENTS

| | | |
|---|---|---|
| 2008/0077290 A1* | 3/2008 | Weinmann et al. ............. 701/35 |
| 2008/0100873 A1* | 5/2008 | Ohtsu ............................ 358/403 |
| 2008/0127311 A1* | 5/2008 | Yasaki et al. ..................... 726/4 |
| 2008/0301158 A1* | 12/2008 | Brown et al. .................. 707/100 |
| 2009/0077231 A1* | 3/2009 | Sakai et al. ................... 709/224 |
| 2010/0026826 A1* | 2/2010 | Lee et al. .................... 348/222.1 |
| 2010/0033586 A1* | 2/2010 | Kim ........................... 348/211.6 |
| 2010/0067369 A1* | 3/2010 | Deishi ........................... 370/216 |
| 2011/0029488 A1* | 2/2011 | Fuerst et al. ................. 707/636 |
| 2011/0301969 A1* | 12/2011 | Pendse .............................. 705/2 |

* cited by examiner

INFORMATION PROCESSING DEVICE, INFORMATION PROCESSING METHOD, AND COMPUTER-READABLE RECORDING MEDIUM

BACKGROUND OF THE INVENTION

1. Field of the Invention

This invention relates to an information processing device, an information processing method, and a computer-readable recording medium, which are adapted to collect device information from a device connected via a first network and to transmit the device information to a server device connected via a second network.

2. Description of the Related Art

Conventionally, it is known that a remote monitoring system is used by a maintenance contractor taking charge of maintenance work or a manufacturer of image forming devices, to monitor the image forming devices, such as copiers, printers, or multi-function peripherals, which are installed in offices and so on, through the Internet.

Generally, the remote monitoring system includes a device (device information collecting device) which collects device information from an image forming device installed in the user site, and a server device installed in the maintenance contractor site. The device information is transmitted from the device information collecting device to the server device through the Internet.

Alternatively, there may be another composition of the remote monitoring system in which the image forming device transmits the device information to the server device directly.

The device information may be used for billing purposes or may contain personal information of the user, confidential information of the user, etc., and transmission of the device information requires secure communication between the device information collecting device (or the image forming device) and the server device.

For this reason, in order to prevent an alteration, spoofing, etc. of data on the transmitting path, the mutual authentication and the encryption communication between the client (the device information collecting device or the image forming device) and the server device are performed using a SSL (secure socket layer).

In order to perform the mutual authentication, it is necessary that both the client and the server device have a secret key, respectively. This secret key is the information which must not be revealed by any means, in order to keep the security of the remote monitoring system. Moreover, it is necessary that the introduction of a secret key is permitted only for the client which is accepted by the maintenance contractor.

Japanese Laid-Open Patent Application No. 2004-320715 discloses a remote monitoring system in which a public key certificate and a secret key which are uniquely discriminable for each of image forming devices are built in each of the image forming devices at the time of factory shipment is used as a client. Namely, the public key certificate and the secret key are built in each of the client devices including the image forming devices and the device information collecting devices. The secret key may be recorded in each client device at the time of factory shipment such that it cannot be physically read out. The uniqueness and the safety of the secret key are secured by doing so.

However, the flexibility of the remote monitor system is inadequate because the public key certificate and the secret key must be built in each of the device information collecting devices at the time of factory shipment. It is desirable to realize the function of the device information collecting device by the software that is installable in a general-purpose computer, such as PC (personal computer).

However, when a package of the software is downloaded via the Internet or a recording medium, such as a CD-ROM and storing the package of the software is distributed, it is necessary to create the package of the software by copying. For this reason, it is difficult to introduce the secret key which is uniquely discriminable for each package into a PC in which the software is installed safely.

Moreover, if the above-described package is distributed through a network, an outsider may easily obtain the above-described package, and a possibility that the outsider has access to the server device illegally by using the above-described software will be increased.

SUMMARY OF THE INVENTION

In one aspect of the invention, the present disclosure provides an improved information processing device and method in which the above-described problems are eliminated.

In one aspect of the invention, the present disclosure provides an information processing device and an information processing method which are capable of keeping the security of the remote monitoring system of image forming devices appropriately.

In an embodiment of the invention which solves or reduces one or more of the problems, the present disclosure provides an information processing device which collects device information from a device connected via a first network and transmits the device information to a server device connected via a second network, the information processing device comprising: a certificate acquiring part configured to acquire a first public key certificate and a first secret key from the server device by acquiring an individual identification information which is uniquely discriminable for the information processing device from the information processing device and transmitting the individual identification information to the server device; and a judging part configured to determine whether the information processing device is permitted to transmit the device information to the server device through an encryption communication using the first public key certificate and the first secret key, by acquiring the individual identification information from the information processing device and comparing the acquired individual identification information with the individual identification information associated with at least one of the first public key certificate and the first secret key.

DETAILED DESCRIPTION OF THE PREFERRED EMBODIMENTS

An information processing device of an embodiment of the invention collects device information from a device connected via a first network and transmits the device information to a server device connected via a second network, the information processing device comprising: a certificate acquiring part configured to acquire a first public key certificate and a first secret key from the server device by acquiring an individual identification information which is uniquely discriminable for the information processing device from the information processing device and transmitting the individual identification information to the server device; and a judging part configured to determine whether the information processing device is permitted to transmit the device information to the server device through an encryption communication using the first public key certificate and the first secret key, by acquiring the individual identification information from the information processing device and comparing the acquired individual identification information with the individual identification information associated with at least one of the first public key certificate and the first secret key.

An information processing method of an embodiment of the invention is for use in an information processing device which collects device information from a device connected via a first network and transmits the device information to a server device connected via a second network, the information processing method comprising the steps of: acquiring a first public key certificate and a first secret key from the server device by acquiring an individual identification information which is uniquely discriminable for the information processing device from the information processing device and transmitting the individual identification information to the server device; and determining whether the information processing device is permitted to transmit the device information to the server device through an encryption communication using the first public key certificate and the first secret key, by acquiring the individual identification information from the information processing device and comparing the acquired individual identification information with the individual identification information associated with at least one of the first public key certificate and the first secret key.

According to the information processing device and method of the embodiments of the invention, it is possible to keep the security of the remote monitoring system of image forming devices appropriately.

Other objects, features and advantages of the present invention will become more apparent from the following detailed description when read in conjunction with the accompanying drawings.

A description will be given of embodiments of the invention with reference to the accompanying drawings.

Figure 1:
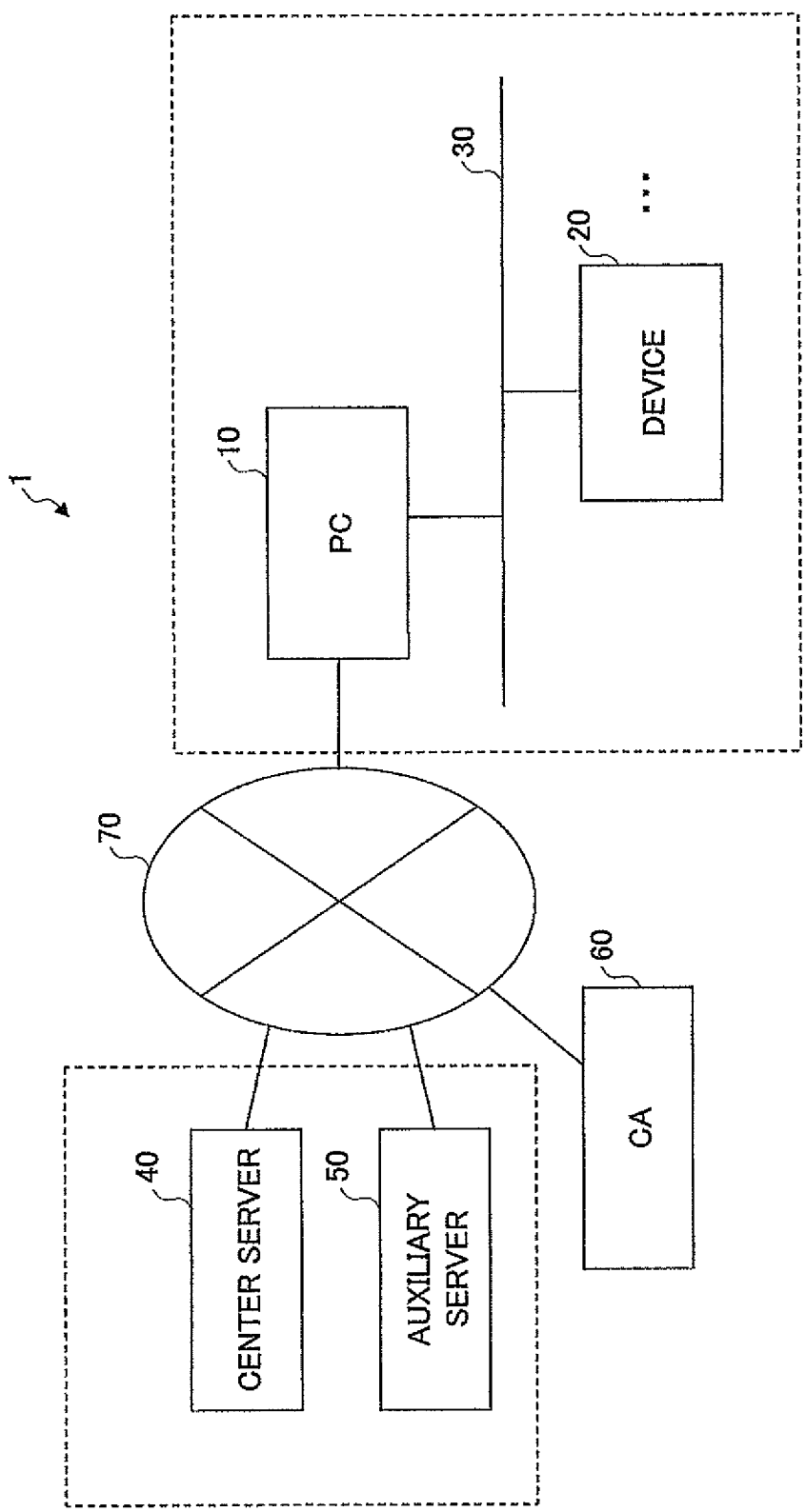
FIG. 1 is a diagram showing the composition of a device monitoring system in an embodiment of the invention.

FIG. 1 shows the composition of a device monitoring system 1 in an embodiment of the invention. As shown in FIG. 1, the device monitoring system 1 includes a PC (personal computer) 10, one or more devices 20, a center servers 40, an auxiliary server 50, and a CA (certificate authority) 60. The PC 10 and the devices 20 are interconnected by a wired or wireless network 30, such as LAN (local area network).

Moreover, the PC 10, the center server 40, the auxiliary server 50, and the CA 60 are interconnected by a network 70, such as the Internet.

The PC 10 and the devices 20 are installed in the user site of the devices 20 (such as an office in which the devices 20 are installed). Each of the devices 20 is an image forming device, such as a copier, a printer, a facsimile or a multi-function peripheral. The devices 20 are objects of monitoring by the device monitoring system 1. The PC 10 collects from each of the devices 20 the monitoring information (device information) which indicates any of the counter values, operation situations, etc. The PC 10 transmits the collected device information to the center server 40 through an encryption communication (for example, the SSL (secure socket layer) communication). There may be two or more user sites which are covered by the device monitoring system, and two or more PCs 10 may be arranged in the respective user sites.

In the device monitoring system 1 of FIG. 1, the center server 40 and the auxiliary server 50 are installed in the monitoring site of the devices 20 (such as, the site of the maintenance service provider for the devices 20, or the site of the manufacturer of the devices 20).

The center server 40 receives device information from the PC 10 and accumulates the device information during normal operation of the device monitoring system 1. The auxiliary server 50 performs the process for ensuring the safety of the transmission of data from the PC 10 to the center server 40. Specifically, the process performed by the auxiliary server 50 is to introduce a secret key and a public key certificate, which are uniquely discriminable for each of the PCs 10, into each of the PCs 10. The secret key and the public key certificate are used for performing the mutual authentication and the encryption communication between the PC 10 and the center server 40.

The CA 60 is a certificate authority which includes one or more computers and performs the process of issuing the public key certificate and so on.

Figure 2:
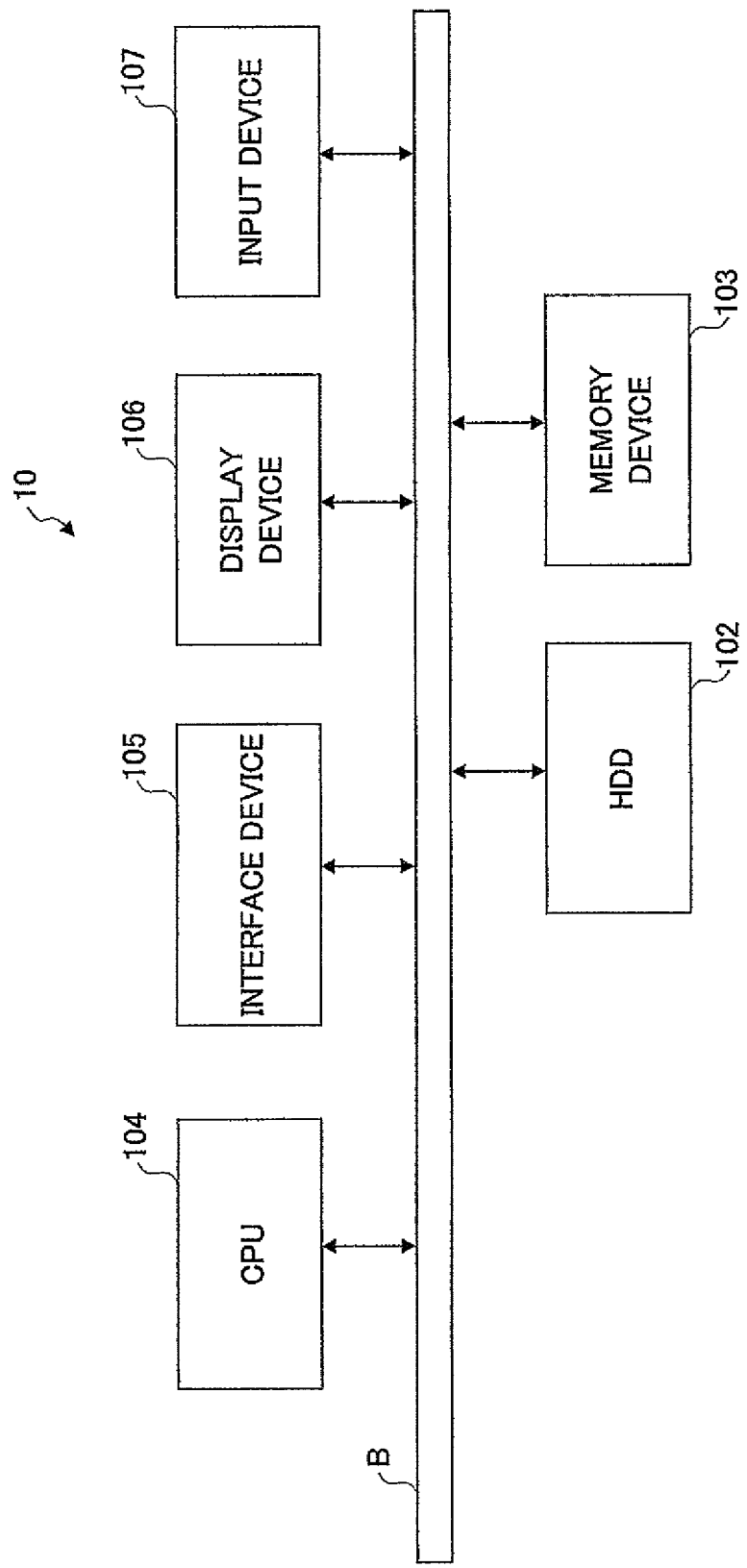
FIG. 2 is a diagram showing the hardware composition of a PC in an embodiment of the invention.

FIG. 2 shows the hardware composition of a PC of an embodiment of the invention. As shown in FIG. 2, the PC 10 includes a HDD 102, a memory device 103, a CPU 104, an interface device 105, a display device 106, and an input device 107, which are interconnected by a bus B. For example, a program (device information notification program) which enables the PC 10 to perform various processes is downloaded through a network and installed in the HDD 102. The HDD 102 stores not only the installed device information notification program but also necessary files, data, etc.

The memory device 103 reads the device information notification program from the HDD 102 when a starting request of the device information notification program is received, and stores the device information notification program therein. The CPU 104 carries out the functions of the PC 10 according to the device information notification program stored in the memory device 103. The interface device 105 is used as an interface for connecting the PC 10 to the network. The display device 106 displays GUIs (graphical user interfaces) by the device information notification program. The input device 107 includes a keyboard, a mouse, etc., and the input device 107 is used by the user to input various operational commands.

It is not necessary to perform installation of the device information notification program through the network. For example, the program may be installed using a recording medium, such as CD-ROM or SD card.

Figure 3:
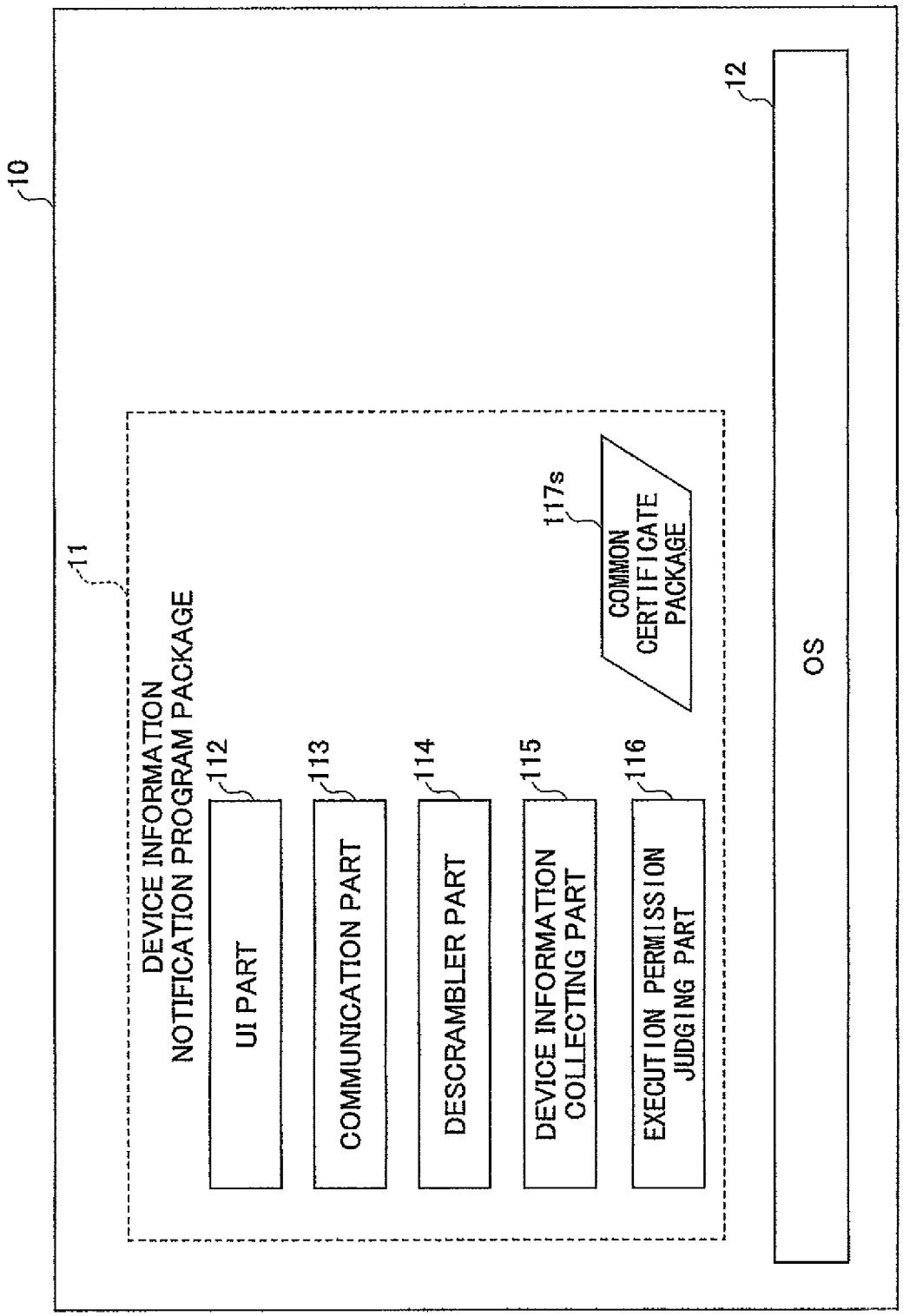
FIG. 3 is a diagram showing the functional composition of the PC immediately after a device information notification program is installed.

FIG. 3 shows the functional composition of the PC immediately after the device information notification program is installed. As shown in FIG. 3, the device information notification program package 11 includes a UI part 112, a communication part 113, a descrambler part 114, a device information collecting part 115, an execution permission judging part 116, and a common certificate package 117s. Among these parts, the UI part 112, the communication part 113, the descrambler part 114, the device information collecting part 115, and the execution permission judging part 116 operate on the OS 12.

The UI part 112 displays the GUI (Graphical User Interface) on the display device 106 and provides the functions of detection of user requests and supply of the information to the user. The communication part 113 performs communication with the center server 40 and the auxiliary server 50. The descrambler part 114 descrambles the common certificate package 117s. Namely, the common certificate package 117s is contained in the device information notification program package 11 in the state in which the contents of the common certificate package 117s are scrambled (encrypted). Thus, the common certificate package 117s immediately after the installation the device information notification program is stored in the HDD 102 in the scrambled condition.

The device information collecting part 115 collects the device information from the device 20 connected to the network 30. The execution permission judging part 116 judges the permission of execution of the device information notification program at the time of use of the service (device monitoring service) by the device information monitoring system 1.

The common certificate package 117s is a package of the digital certificate in conformity with the PKCS (public key cryptography standards), and this common certificate package 117s is needed in order to perform an encryption communication between the PC 10 and the auxiliary server 50 using the SSL.

However, as described above, in the initial state, the common certificate package 117s is stored in the scrambled condition. Therefore, the encryption communication between the PC 10 and the auxiliary server 50 cannot be performed in this condition. If the encryption communication between the PC 10 and the auxiliary server 50 cannot be performed, a certificate package (individual certificate package) which is uniquely discriminable for each PC 10 cannot be obtained. The individual certificate package is needed in performing the encryption communication between the PC 10 and the center server 40, but if it is not obtained, the device monitoring service cannot be used. This is because the center server 40 does not permit transmission of the device information received from a PC 10 which does not have a correct individual certificate package.

For this reason, the user who wishes to use the device monitoring service makes a predefined contract (device monitoring contract) with the monitoring site. By making the device monitoring contract, the user is permitted to obtain the key information (common key) for canceling the scrambled condition of the common certificate package 117s.

The device information notification program package 11 is merely a copy of the master program package. Therefore, the common certificate package 117s included in each of the device information notification program packages 11 distributed to respective user sites is common to the packages 11 and it does not differ for each package 11. Moreover, the common key which is used for scrambling the common certificate package 117s contained in each device information notification program package 11 is also common to the device information notification program packages 11.

Figure 4:
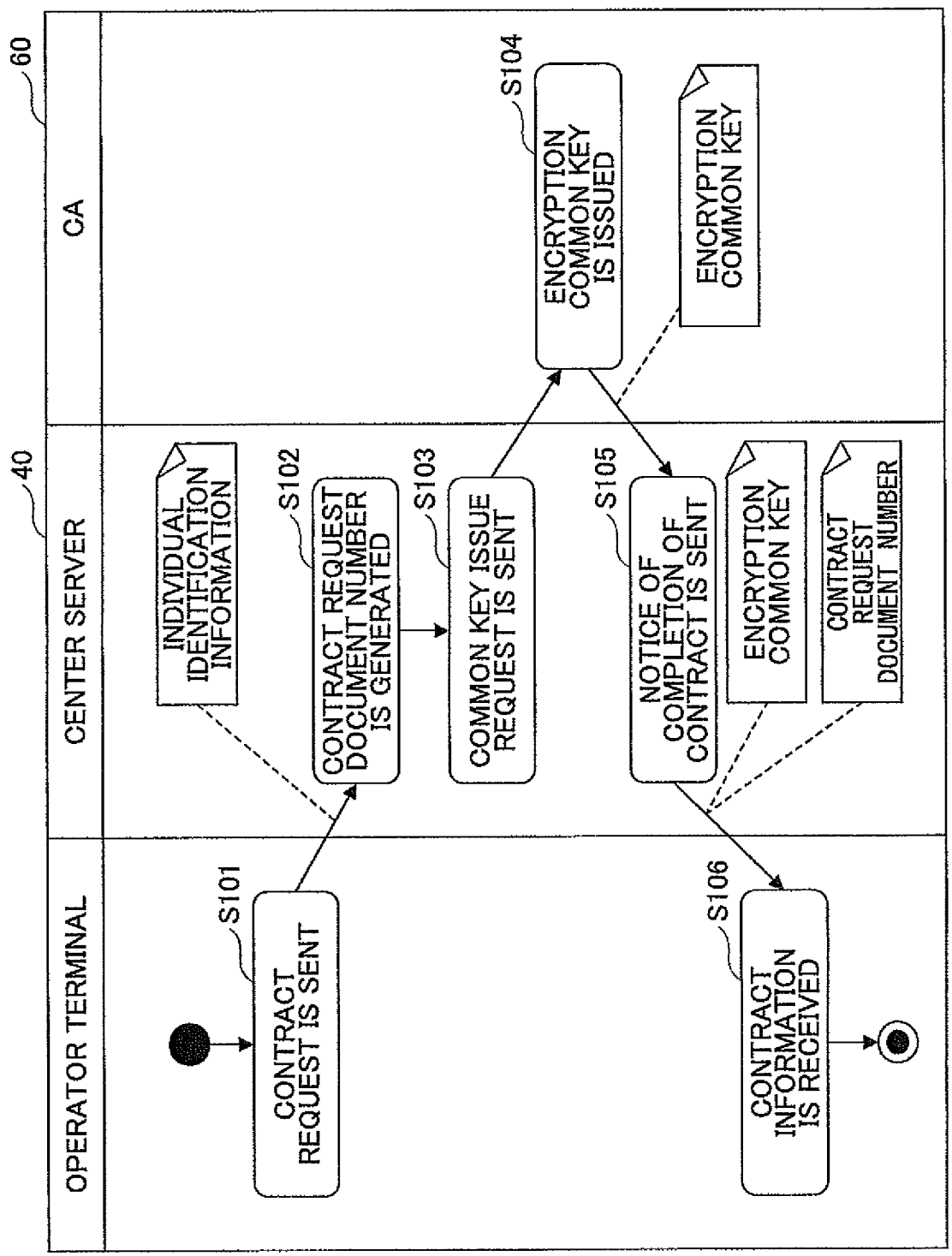
FIG. 4 is a diagram for explaining the process of making a device monitoring contract with a center server.

FIG. 4 is a diagram for explaining the procedure of making a device monitoring contract with the center server 40. In FIG. 4, the operator terminal may be the PC 10 or may be another PC (personal computer) which is connectable with the Internet.

In the process shown in FIG. 4, a user inputs uniquely discriminable information of the PC 10 (individual identification information) in a contract request page (a virtual contract) displayed on the web browser of the operator terminal as necessary information and presses the "transmit" button. The operator terminal transmits a device monitoring contract request, containing the input individual identification information, to the center server 40 (S101). For example, this individual identification information may be a MAC (media access control) address.

In response to the device monitoring contract request received, the center server 40 generates a contract request document number which is a uniquely discriminable number for each contract (S102). Subsequently, the center server 40 transmits a common key issue request, containing the individual identification information, to the CA 60 (S103).

For example, the CA 60 encrypts a pre-stored common key using the individual identification information (reversible conversion) to generate the encrypted common key. This encrypted common key will be called the "encryption common key". Subsequently, the CA 60 sends the encryption common key to the center server 40 (S104). This encryption common key is generated by performing the encryption using the individual identification information, and the encryption common key is uniquely discriminable for each PC 10.

Subsequently, the center server 40 transmits a notice of completion of the contract to the operator terminal together with the encryption common key and the contract request document number (S105). Then, the operator terminal receives the encryption common key and the contract request document number, and stores them in the memory device. This contract request document number may be displayed on the display device at this time.

After the above-described process is performed, the user is able to obtain the encryption common key (common key) for canceling the scrambling of the common certificate package 117s.

Next, descrambling (decryption) of the common certificate package 117s is performed. However, when the operator terminal used at the time of making the contract is another PC different from the PC 10, the encryption common key has to be stored in the HDD 102 of the PC 10 before starting the descrambling.

Figure 5:
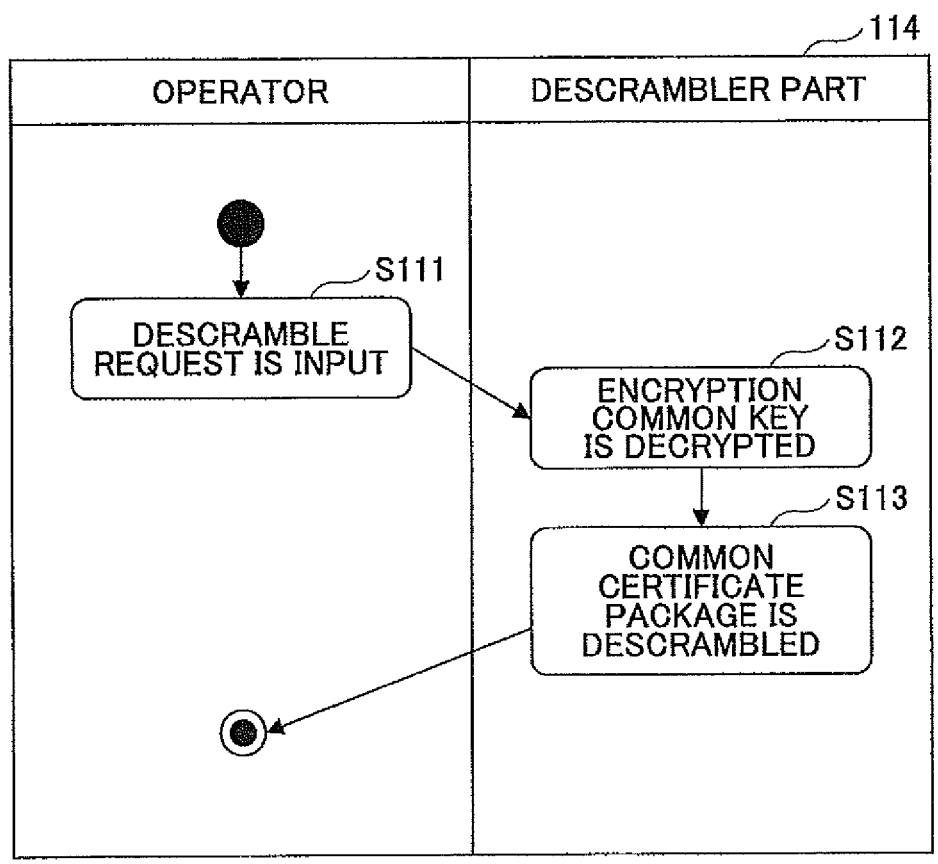
FIG. 5 is a diagram for explaining the process of descrambling a common certificate package.

FIG. 5 is a diagram for explaining the process of descrambling of a common certificate package.

In the process of FIG. 5, viewing the screen displayed on the display device 106 by the UI part 112 of the PC 10, the user inputs a descramble request of the scrambled common certificate package 115s (S111). In response, the descrambler part 113 acquires the individual identification information from the HDD 102 of the PC 10 and decrypts the encryption common key using the individual identification information (S112).

Because the individual identification information is uniquely discriminable for each PC 10, the decryption of the encryption common key is successful only in the PC 10 in which the individual identification information has been specified at the time of making the contract. In this embodiment, the common key is encrypted using the individual identification information and the encrypted common key is distributed to the contracted PC 10, and it is possible to prevent the decryption of the encryption common key by any un-contracted PC.

Subsequently, the descrambler part 113 descrambles the common certificate package 117s by using the decrypted common key, and stores the descrambled common certificate package 117 in the HDD 102. Thereby, the PC 10 is able to use the information contained in the common certificate package 117.

Figure 6:
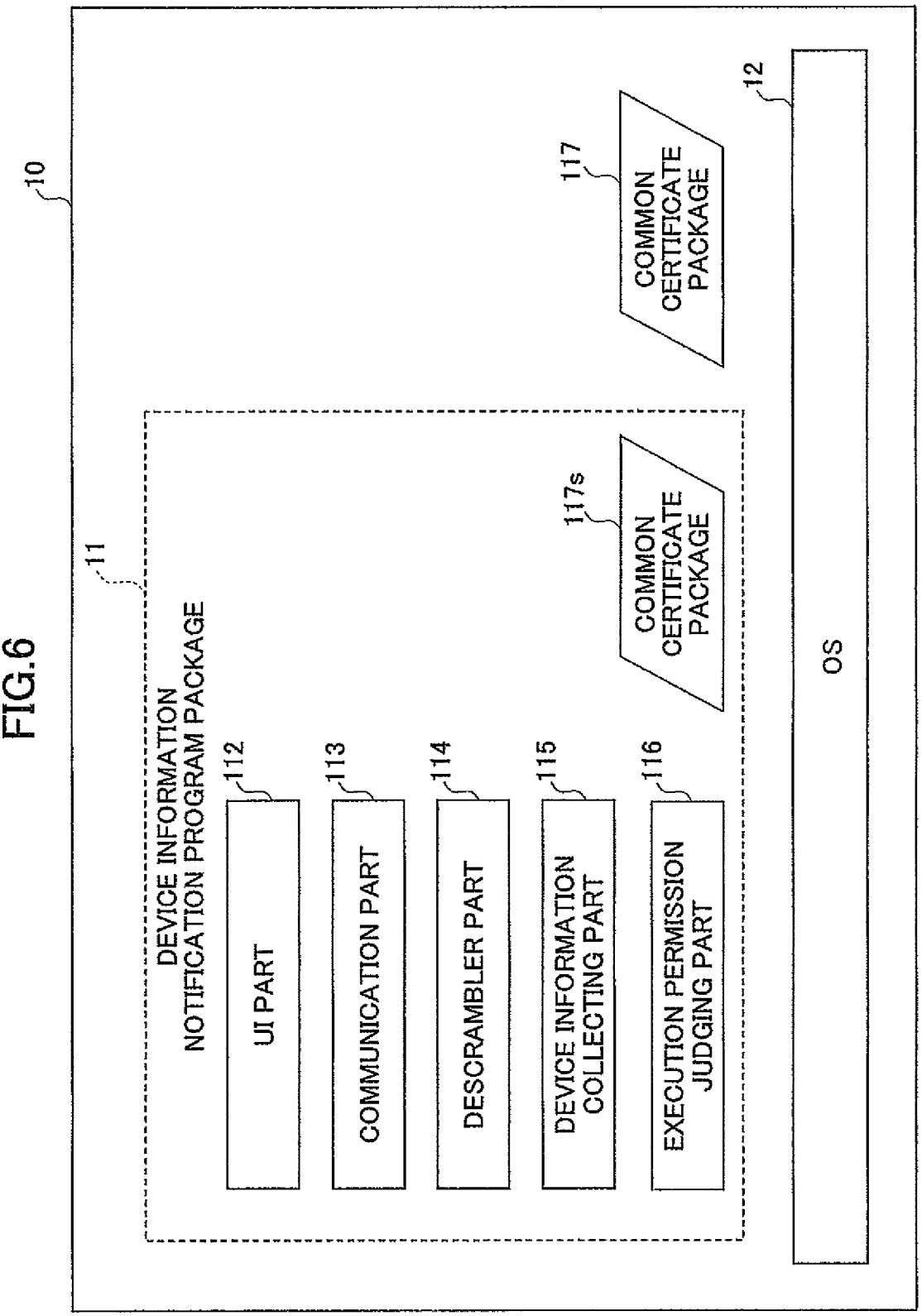
FIG. 6 is a diagram showing the functional composition of a PC after the common certificate package is descrambled.

FIG. 6 shows the functional composition of the PC after the common certificate package is descrambled. As shown in FIG. 6, the common certificate package 117 which is generated by decrypting the common certificate package 117s is included as a new component in the PC 10.

Figure 7:
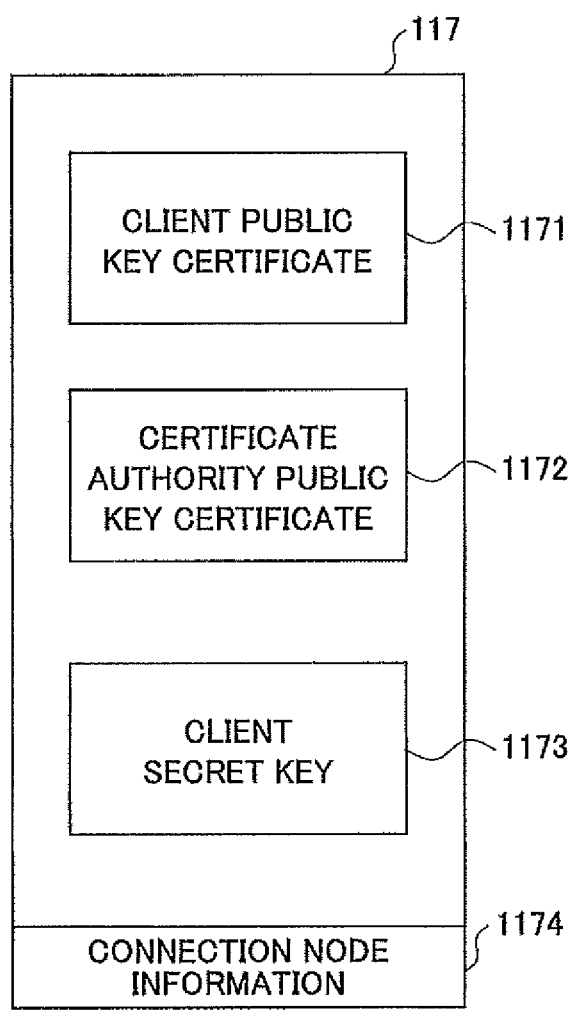
FIG. 7 is a diagram showing the composition of a common certificate package.

FIG. 7 shows the composition of a common certificate package. As shown in FIG. 7, the common certificate package 117 includes a client public key certificate 1171, a certificate authority public key certificate 1172, a client secret key 1173, and connection node information 1174.

The client public key certificate 1171 and the client secret key 1173 are used in the encryption communication between the PC 10 and the auxiliary server 50 as a public key certificate and a secret key on the side of the PC 10.

The certificate authority public key certificate 1172 is a public key certificate of the CA 60. The connection node information 1174 is identification information of a connection node of the encryption communication using the common certificate package 117. In this embodiment, the connection node information 1174 is, for example, an IP address of the auxiliary server 50.

Figure 8:
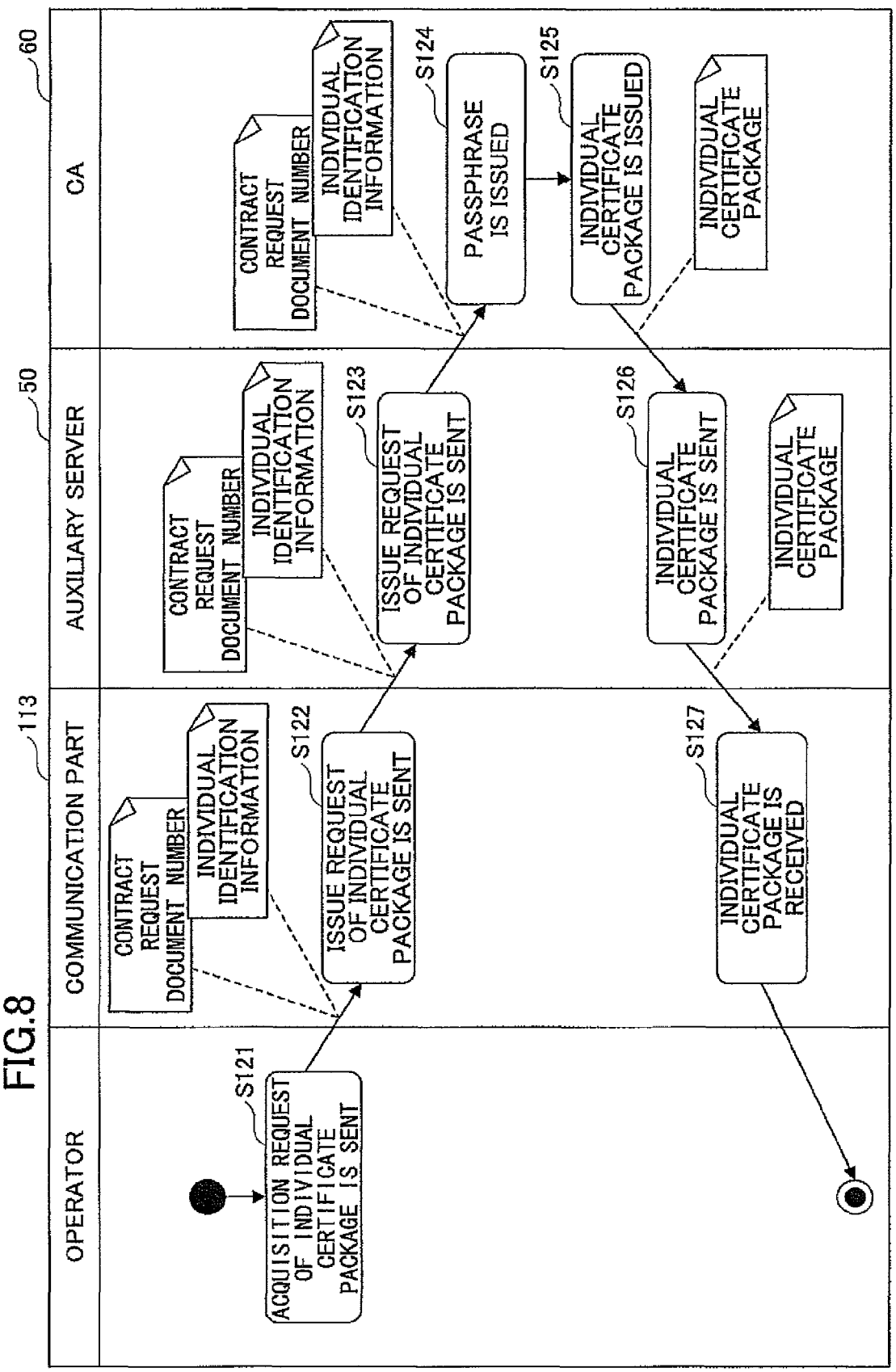
FIG. 8 is a diagram for explaining the process of acquisition of an individual certificate package.

Next, the process of acquiring an individual certificate package which is uniquely discriminable for each PC 10 is performed by the encryption communication using the common certificate package 117. FIG. 8 is a diagram for explaining the process of acquisition of an individual certificate package.

In the process of FIG. 8, viewing the screen displayed on the display device 106 by the UI part 112 of the PC 10, the user inputs the contract request document number and inputs an acquisition request of the individual certificate package (S121). In response, the communication part 113 transmits an issue request of individual certificate package, containing the input contract request document number and the individual identification information of the PC 10, to the auxiliary server 50 (S122).

In this case, the issue request of the individual certificate package cannot be transmitted if authentication is not performed using the common certificate package 117. Therefore, only the communication part 113 of the PC 10 having the correct common certificate package 117 is able to transmit the issue request of the individual certificate package to the auxiliary server 50 at the step S122. The process of authentication will be described later.

The UI part 112 or the communication part 113 may be arranged to check the format of the input contract request document number such that, if the format is not in agreement with the pre-defined format, the process of acquisition of an individual certificate package is stopped. This will reduce the possibility of acquisition of an individual certificate package by another person different from the contractor.

Subsequently, the auxiliary server 50 transmits an issue request of the individual certificate package, containing the contract request document number and the individual identification information, to the CA 60 (S123).

Subsequently, the CA 60 issues (or generates) a passphrase for protecting an individual certificate package, based on the individual identification information (S124). This passphrase may be the individual identification information itself or the individual identification information may be converted into the passphrase according to the predetermined rules.

Subsequently, the CA 60 generates an individual certificate package which is uniquely discriminable for each PC 10, and transmits the individual certificate package to the auxiliary server 50 (S125). When the CA 60 generates the individual certificate package, the CA 60 records (or embeds) the passphrase in the individual certificate package.

Subsequently, the auxiliary server 50 transmits the individual certificate package to the communication part 113 of the PC 10 (S126). The communication part 113 receives the individual certificate package from the auxiliary server 50, and stores the individual certificate package in the HDD 102 (S127).

Figure 9:
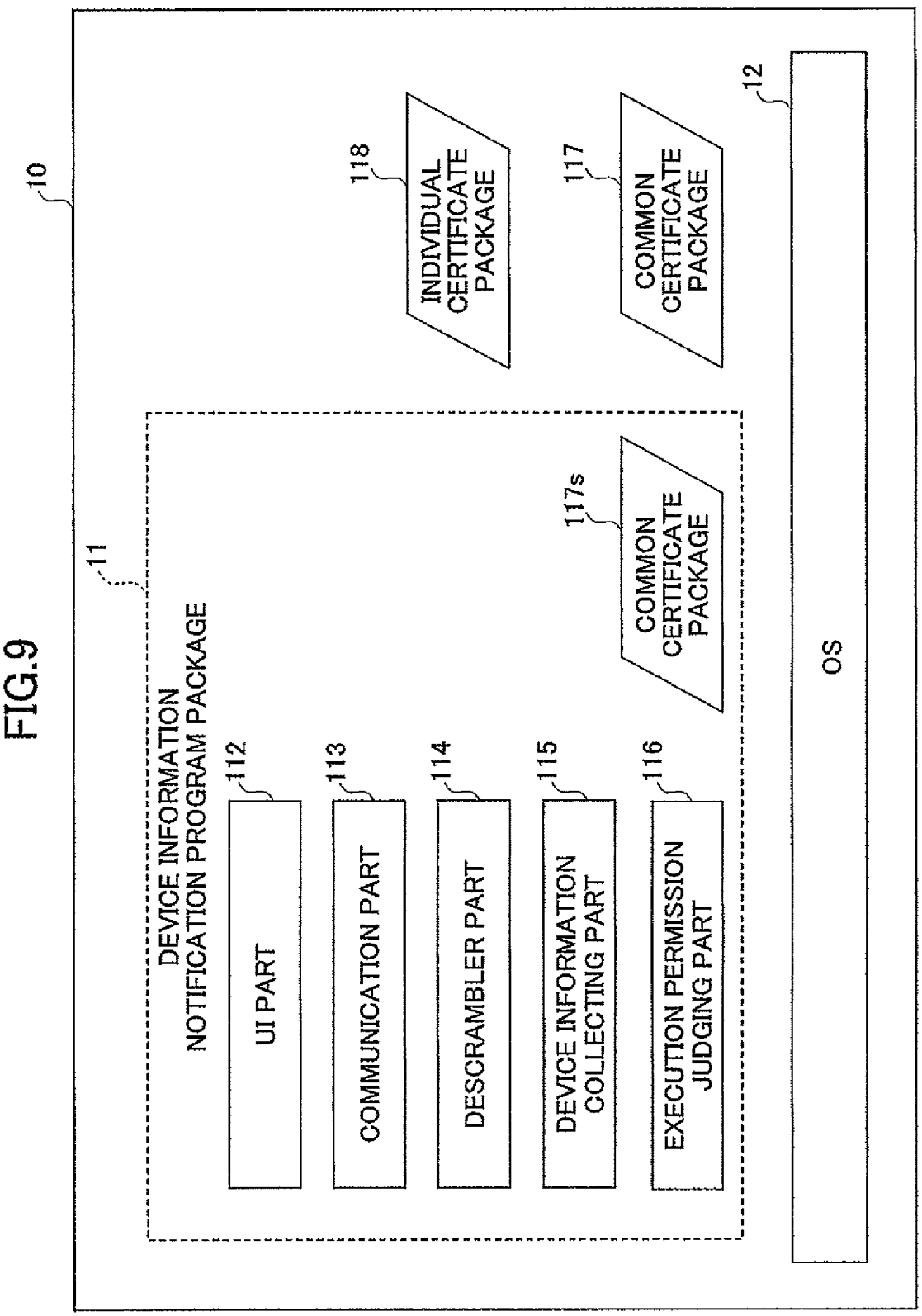
FIG. 9 is a diagram showing the functional composition of a PC after an individual certificate package is introduced.

FIG. 9 shows the functional composition of the PC after the individual certificate package is introduced. As shown in FIG. 9, the individual certificate package 118 is included in the PC 10 as a new component.

Figure 10:
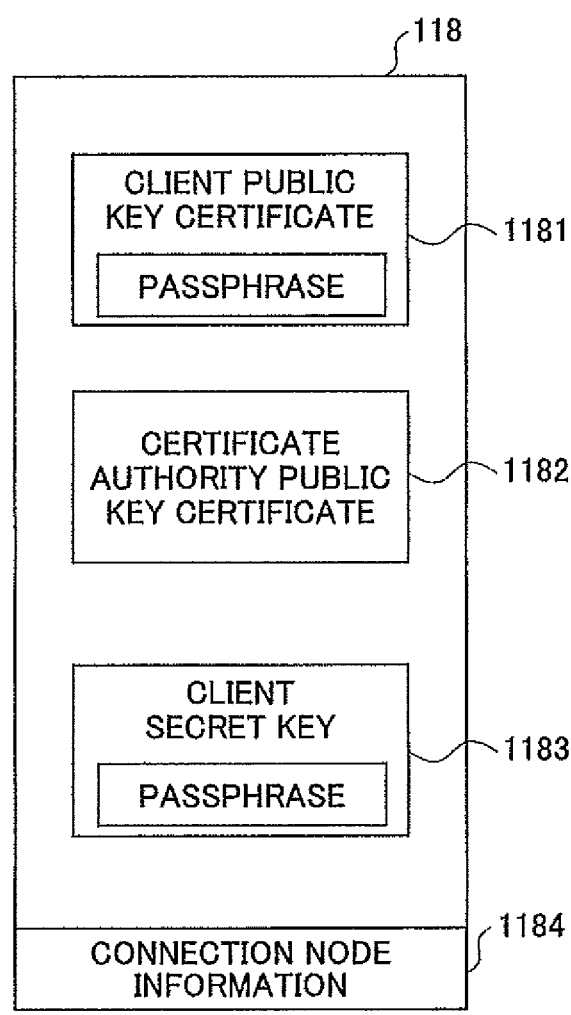
FIG. 10 is a diagram showing the composition of an individual certificate package.

FIG. 10 shows the composition of an individual certificate package. As shown in FIG. 10, the individual certificate package 118 includes a client public key certificate 1181, a certificate authority public key certificate 1182, a client secret key 1183, and connection node information 1184.

The client public key certificate 1181 and the client secret key 1183 are used in the encryption communication between the PC 10 and the center server 40 as a public key certificate and a secret key of the side of the PC 10.

The certificate authority public key certificate 1182 is a public key certificate of the CA 60. The connection node information 1184 is identification information of a connection node of the encryption communication using the common certificate package 118. In this embodiment, the connection node information 1184 is, for example, an IP address of the center server 40.

The passphrase is recorded in or associated with at least one of the client public key certificates 1181 and the client secret keys 1183.

After the process of FIG. 8 is performed, the individual certificate package 118 which is used for communicating with the center server 40 is introduced into the PC 10, and the PC 10 is able to use the device monitoring service. Specifically, the PC is able to transmit the device information of the device 20 to the center server 40 via the network 70.

Figure 11:
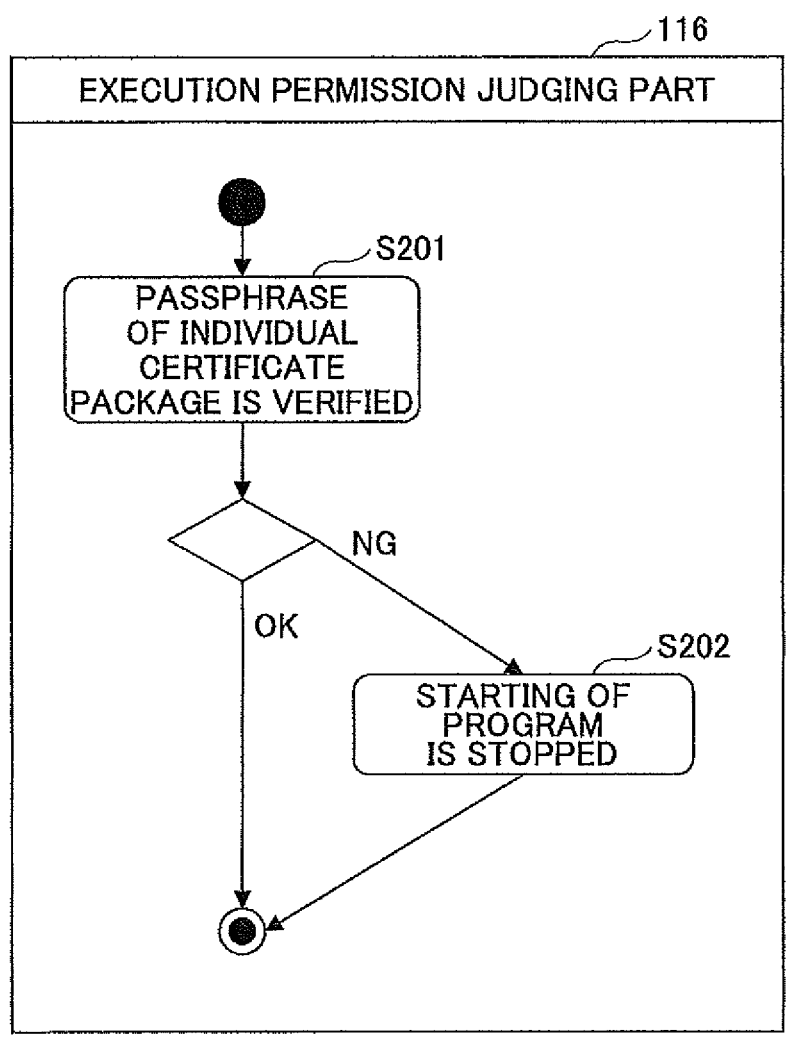
FIG. 11 is a diagram for explaining the process performed at the time of using a device monitoring service.

Next, the process performed at the time of using the device monitoring service will be described. FIG. 11 is a diagram for explaining the process performed at the time of using the device monitoring service.

As shown in FIG. 11, when starting of the device information notification program is instructed by the user at the time of using the device monitoring service, the execution permission judging part 116 acquires the individual identification information from the PC 10 and verifies the passphrase associated with the at least one of the client public key certificate 1181 and the client secret key 1183 in the individual certificate package 118 (S201).

Specifically, when the passphrase generated by the CA 60 is the individual identification information itself, the execution permission judging part 116 compares the passphrase of the individual certificate package 118 with the individual identification information acquired from the PC 10. When the passphrase is generated by converting the individual identification information according to the predetermined rules by the CA 60, the execution permission judging part 116 converts the individual identification information (acquired from the PC 10) according to the predetermined rules, and compares the passphrase of the individual certificate package 118 with the passphrase generated after conversion.

When the result of the comparison is negative (not in agreement), the execution permission judging part 116 stops starting of the device information notification program (S202). On the other hand, when the result of the comparison is affirmative (in agreement), the execution permission judging part 116 does not perform the step S202, and starting of the device information notification program is allowed. In the latter case, the device information notification program is started normally. Accordingly, even if the individual certificate package 118 is copied to another PC, the device information notification program cannot be started by that PC.

After the device information notification program is started normally, the device information collecting part 115 collects the device information from each of the devices 20. Moreover, the communication part 113 transmits the collected device information to the center server 40 through the network 70. The process of authentication is performed using the individual certificate package 118 at the time of transmitting the device information to the center server 40. Therefore, only the PC 10 having the correct individual certificate package 118 is allowed to transmit the device information to the center server 40 through the network 70.

It is not necessary to perform the process of FIG. 11 at the time of starting the device information notification program. The process of FIG. 11 may be performed at any time before the device information is transmitted to the center server 40.

Figure 12:
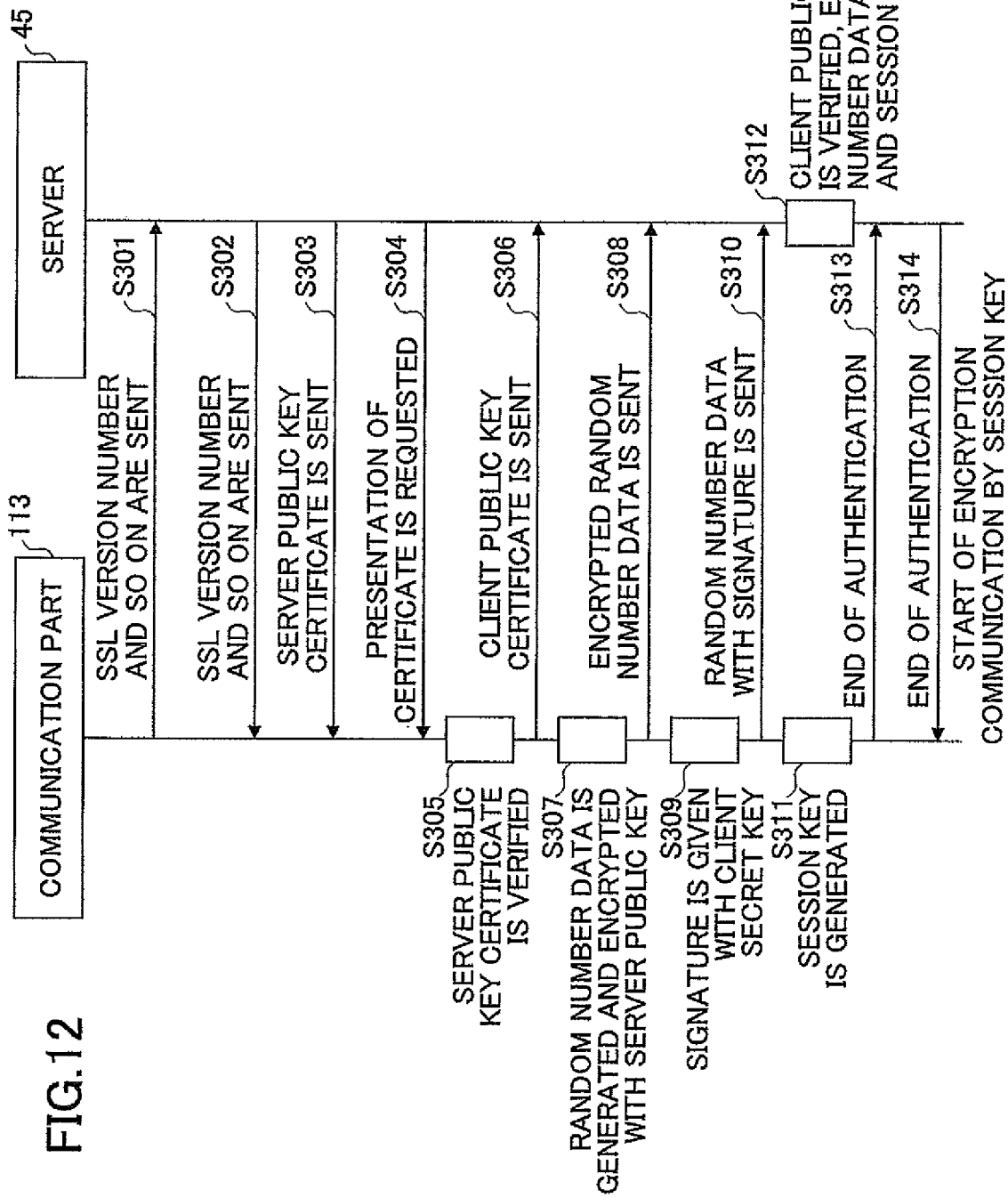
FIG. 12 is a sequence diagram for explaining the process of authentication using the SSL.

Next, the process of authentication which is performed when the communication part 113 communicates with the auxiliary server 50 or the center server 40 will be described. FIG. 12 is a sequence diagram for explaining the process of authentication using the SSL. In FIG. 12, the server 45 may be the auxiliary server 50 or the center server 40.

In order to start the authentication process of FIG. 12, it is necessary that the certificate package be already introduced in the server 45 as well. Namely, it is assumed in this embodiment that a certificate package that is specific to each of the auxiliary server 50 and the center server 40 is introduced (stored) in the auxiliary server 50 and the center server 40 beforehand, respectively. This certificate package contains a secret key (server secret key) which is uniquely discriminable for each server 45, a public key certificate (server public key certificate) which is uniquely discriminable for each server 45, and a public key certificate of the certificate authority 60.

Upon starting of the communication, the communication part 113 transmits an SSL version number, a currently supported encryption code set, a random number, etc. to the server 45 (S301). In response, the server 45 transmits the SSL version number, the encryption code set to be used, the random number, etc. to the communication part 113 (S302).

Subsequently, the server 45 transmits the server public key certificate to the communication part 113 (S303). Subsequently, the server 45 requests presentation of a certificate of the communication part 113 (S304). Then, the server 45 is in a waiting condition until a response is received from the communication part 113.

After the server public key certificate is received, the communication part 113 verifies the received server public key certificate by using the certificate authority public key certificate 1182 (S305).

When the justification of the server public key certificate is checked, the communication part 113 transmits the client public key certificate 1181 to the server 45 (S306). Subsequently, the communication part 113 encrypts the premaster secret (random number), which is computed based on the hash value of the currently exchanged data, by using the server public key (S307).

Subsequently, the communication part 113 transmits the encrypted premaster secret (random number) to the server 45 (S308). Subsequently, the communication part 113 gives a signature to the random number data, which is computed based on the currently exchanged data, by using the client secret key (S309).

Subsequently, the communication part 113 transmits the random number data with the signature to the server 45 (S310). Subsequently, the communication part 113 generates a session key based on the two seeds and the premaster secret (S311).

Next, the server 45 verifies the received client public key certificate 1181 by using the certificate authority public key certificate contained in the server 45. The server 45 verifies the random number data with the signature by using the client public key certificate 1181. Then, the server 45 generates a session key based on the premaster secret (which is decrypted by using the server secret key) and the two seeds (S312).

In the next step, the communication part 113 transmits a message indicating that data will be transmitted using this common key from now on and a message indicating the end of SSL authentication to the server 45 (S313). Subsequently, the server 45 transmits a message indicating that data will be transmitted using this common key from now on and a message indicating the end of SSL authentication to the communication part 113 (S314). In a subsequent step, the encryption communication using the session key will be started as shown in FIG. 12.

By the encryption communication, the communication part 113 transmits the issue request of the individual certificate package to the auxiliary server 50 in the step S122 of FIG. 8, and transmits the device information to the center server 40. Therefore, when the correct common certificate package 117 or the correct individual certificate package 118 is not introduced in the PC 10, the process of authentication of FIG. 4 cannot be successfully performed by the PC 10, and the subsequent communication cannot be continued.

If the server 45 is a forged server device owned by any person other than the owner of the certificate, the server device does not have a secret key and is unable to decrypt the premaster secret received from the communication part 113 in the process of FIG. 12. If the communication part 113 is included in a forged client device owned by any person other than the owner of the certificate, the client is unable to check the signature from the user in the process of FIG. 12. Therefore, the process of FIG. 12 enables the mutual authentication between the server 45 and the PC 10 to be performed.

As described in the foregoing, according to the PC 10 of the embodiment of the invention in the device monitoring system 1, the security of distribution of the individual certificate package 118 or the security of transmission of the device information can be kept appropriately.

The present invention is not limited to the specifically disclosed embodiments, and variations and modifications may be made without departing from the scope of the present invention.

The present application is based on Japanese patent application No. 2008-030929, filed on Feb. 12, 2008, the contents of which are incorporated herein by reference in their entirety.

What is claimed is:
1. An information processing device which collects device information from a device connected via a first network and transmits the device information to a center server connected via a second network, the information processing device comprising:
- a certificate receiving part configured to receive a first public key certificate and a first secret key from an auxiliary server through the second network after an individual identification information which is uniquely discriminable for the information processing device is received from a memory of the information processing device and the individual identification information is transmitted to the auxiliary server, so that an individual certificate package is stored into the information processing device by the reception of the first public key certificate and the first secret key from the auxiliary server and used to perform the encryption communication between the information processing device and the center server; and
- a judging part configured to determine, when a request for starting the device information transmission is received, whether the information processing device is permitted to transmit the device information to the center server through an encryption communication using the first public key certificate and the first secret key, after the individual identification information is received from the memory of the information processing device and a first passphrase of the received individual identification information is compared with a second passphrase associated with at least one of the first public key certificate and the first secret key in the individual certificate package stored in the information processing device,
- wherein the individual certificate package contains the second passphrase associated with the at least one of the first public key certificate and the first secret key.

2. The information processing device according to claim 1, further comprising:
- a memory part configured to store a second public key certificate and a second secret key which are encrypted by a predetermined key information;
- a key information receiving part configured to receive the individual identification information from the memory of the information processing device, transmit a request of the predetermined key information, containing the individual identification information, to the center server through the second network, and receive the predetermined key information which is encrypted based on the individual identification information; and
- a decryption part configured to acquire the individual identification information from the memory of the information processing device, decrypt the predetermined key information using the individual identification information, and decrypt the second public key certificate and the second secret key using the decrypted key information,
- wherein the certificate receiving part receives the first public key certificate and the first secret key, which are uniquely discriminable for the information processing device, through an encryption communication using the decrypted second public key certificate and the decrypted second secret key.

3. The information processing device according to claim 2, wherein the key information receiving part receives a request identification information which is generated uniquely for each of the encrypted key information and the encrypted request of the predetermined key information,
- wherein the information processing device comprises an input part configured to cause a user to input the request identification information, and wherein the certificate receiving part is inhibited from receiving the first public key certificate and the first secret key when a format of the input request identification information is not in agreement with a predetermined format.

4. An information processing method for use in an information processing device which collects device information from a device connected via a first network and transmits the device information to a center server connected via a second network, the information processing method comprising the steps of:
- receiving a first public key certificate and a first secret key from an auxiliary server through the second network after an individual identification information which is uniquely discriminable for the information processing device is received from a memory of the information processing device and the received individual identification information is transmitted to the auxiliary server, so that an individual certificate package is stored into the information processing device by the reception of the first public key certificate and the first secret key from the auxiliary server and used to perform the encryption communication between the information processing device and the center server; and
- determining, when a request for starting the device information transmission is received, whether the information processing device is permitted to transmit the device information to the center server through an encryption communication using the first public key certificate and the first secret key, after the individual identification information is received from the memory of the information processing device and a first passphrase of the received individual identification information is compared with a second passphrase associated with at least one of the first public key certificate and the first secret key in the individual certificate package stored in the information processing device,
- wherein the individual certificate package contains the second passphrase associated with the at least one of the first public key certificate and the first secret key.

5. The information processing method according to claim 4, further comprising the steps of:
- storing a second public key certificate and a second secret key which are encrypted by a predetermined key information;
- receiving the individual identification information from the memory of the information processing device;
- transmitting a request of the predetermined key information, containing the individual identification information, to the center server through the second network;
- receiving the predetermined key information which is encrypted based on the individual identification information;
- receiving the individual identification information from the memory of the information processing device;
- decrypting the predetermined key information using the individual identification information; and
- decrypting the second public key certificate and the second secret key using the decrypted key information,
- wherein the step of receiving the first public key certificate and the first secret key receives the first public key certificate and the first secret key, which are uniquely discriminable for the information processing device, through an encryption communication using the decrypted second public key certificate and the decrypted second secret key.

6. The information processing method according to claim 5, wherein the step of receiving the predetermined key information receives a request identification information which is generated uniquely for each of the encrypted key information and the encrypted request of the predetermined key information, wherein the information processing method comprises a step of causing a user to input the request identification information, and wherein the step of receiving the first public key certificate and the first secret key is inhibited from being performed when a format of the input request identification information is not in agreement with a predetermined format.

7. A non-transitory computer-readable recording medium storing a program which, when executed by a computer, causes the computer to perform an information processing method for use in an information processing device which collects device information from a device connected via a first network and transmits the device information to a center server connected via a second network, the information processing method comprising the steps of receiving a first public key certificate and a first secret key from an auxiliary server through the second network after an individual identification information which is uniquely discriminable for the information processing device is received from a memory of the information processing device and the received individual identification information is transmitted to the auxiliary server, so that an individual certificate package is stored into the information processing device by the reception of the first public key certificate and the first secret key from the auxiliary server and used to perform the encryption communication between the information processing device and the center server; and determining, when a request for starting the device information transmission is received, whether the information processing device is permitted to transmit the device information to the center server through an encryption communication using the first public key certificate and the first secret key, after the individual identification information is received from the memory of the information processing device and a first passphrase of the received individual identification information is compared with a second passphrase associated with at least one of the first public key certificate and the first secret key in the individual certificate package stored in the information processing device, wherein the individual certificate package contains the second passphrase associated with the at least one of the first public key certificate and the first secret key.

8. The computer-readable recording medium according to claim 7, wherein the information processing method further comprises the steps of storing a second public key certificate and a second secret key which are encrypted by a predetermined key information;

receiving the individual identification information from the memory of the information processing device;

transmitting a request of the predetermined key information, containing the individual identification information, to the center server through the second network;

receiving the predetermined key information which is encrypted based on the individual identification information;

receiving the individual identification information from the memory of the information processing device;

decrypting the predetermined key information using the individual identification information; and decrypting the second public key certificate and the second secret key using the decrypted key information, wherein the step of receiving the first public key certificate and the first secret key receives the first public key certificate and the first secret key, which are uniquely discriminable for the information processing device, through an encryption communication using the decrypted second public key certificate and the decrypted second secret key.

9. The computer-readable recording medium according to claim 8, wherein, the step of receiving the predetermined key information receives a request identification information which is generated uniquely for each of the encrypted key information and the encrypted request of the predetermined key information, wherein the information processing method comprises a step of causing a user to input the request identification information, and wherein the step of receiving the first public key certificate and the first secret key is inhibited from being performed when a format of the input request identification information is not in agreement with a predetermined format.

* * * * *